Patented Dec. 25, 1951

2,579,984

UNITED STATES PATENT OFFICE 2,579,984

FILTERS FOR REMOVING DUST FROM GAS OR AIR

William L. Trowbridge, Newark, Ohio, assignor to Owens-Corning Fiberglas Corporation, a corporation of Delaware No Drawing. Application October 23, 1948, Serial No. 56,261

6 Claims. (Cl. 183—45)

The present invention relates to a gas filter having an adhesive coating. The invention contemplates any well known filtering media whether of strainer or impingement construction. For example, the filtering media may comprise laminations of expanded paper, expanded metal, honeycomb constructions, such as laminations of slitted, corrugated cardboard, laminations of wire screens of various meshes, or a ball-type arrangement wherein a series of balls are placed in immediate contact with each other in a three dimensional construction. Or the filtering media may comprise inorganic fibers such as rock wool, slag wool, steel wool, copper wool, or aluminum wool; or, organic fibers, such as hog hair and other animal hair, cactus fibers, and synthetic resinous fibers. A chip-board or cardboard frame usually encloses the edges of a fibrous filtering media.

In particular, the invention contemplates the type of filter unit disclosed in the United States Patents Nos. 2,220,127 to Slayter and 2,137,246, 2,138,874, and 2,252,724 to Myers. This filter unit comprises glass fibers in a matted or bulk form, related in a jack-straw manner. The fibers may be bonded one to another by a resin, such as phenol-formaldehyde. The unit or filter pack may be faced with reticulated metallic frames and bound on the edges with a fiberboard or cardboard frame, or other material of sufficient rigidity and strength to hold the filter unit in shape.

One of the factors which has aided in the advance of air conditioning within the past decade or so is the development of air filters of the type herein described. These filters are usually impregnated with an adhesive to which the foreign particles in the air adhere during the filtration. The filter removes dirt, lint, soot, and the like. Because of this ability to help purify the air, these filters find large application in hotels, stores, industrial plants, and the like, where they are installed in heating, ventilating, and air conditioning systems.

A limiting factor to even greater application of air filter packs has been the lack of an adhesive suitable under all conditions. Past experience has shown that an ideal adhesive should have the following properties:

1. It should have good dust catching properties.

2. It should not unduly smoke at relatively high temperatures. Most presently used adhesives have the tendency to smoke profusely at even slightly elevated temperatures. If the adhesive so smokes in air filters being used in public buildings or other places where large numbers of people congregate, fear of a supposed fire may result in a panic causing loss of life and property. For this reason, fire insurance underwriters and other authorities will not approve of the use of this adhesive in filters for public buildings, theatres, and the like, unless the content is so very small, for example, three percent, as to minimize this danger. But to achieve this, there is a very serious decrease in filter efficiency.

3. It should not be unduly volatile or otherwise it will evaporate in time from the filter pack.

4. It should have a flash point at least in excess of 350° F., the minimum usually set by underwriters, as a precaution against fire.

5. It should not adversely affect the binding resin of the filter pack. It is frequently necessary to use an elastomer-bonded filter pack when the pack is under a constant jarring, as in trains. Unfortunately, some adhesives are plasticizers. Consequently when they are used on elastomer-bonded filter packs, the elastomer, such as natural rubber latex or thermoplastics, such as the vinyl polymers, softens and loses its ability to bond the fibers.

6. It should remain chemically stable during storage both prior to and after application.

7. It should not be hygroscopic to a deleterious extent. Some adhesives are so hygroscopic that at high relative humidities they actually wash off the filter pack leaving no adhesive at all.

8. It should be non-toxic and non-corrosive so that it may be readily handled during the manufacture of the filter pack and subsequent installation.

9. It should not vary excessively in viscosity at normal operating temperatures.

10. It should have little or no odor.

11. It should not support the growth of disagreeable bacteria.

It is therefore the main object of the present invention to provide a new and novel gas filter adhesive having these desirable properties.

For example, important objects are to provide a gas filter adhesive that does not smoke unduly at even slightly elevated temperatures; that is relatively non-volatile and has a flash point that meets underwriters' approval; that may be used in filter packs bonded with any type of known resin or elastomer; that is not hygroscopic to a deleterious extent, nor corrosive to human skin, nor toxic; and that is chemically stable during storage and whose viscosity does not vary excessively at normal operating temperatures.

More specific objects and advantages are apparent from the following description which merely discloses and illustrates the invention and is not intended to limit the claims.

The present invention comprises a gas filter having a porous medium carrying thereon an adhesive comprising a polyoxyalkylene derivative of the reaction product of a dehydrated hexitol and a saturated fatty acid having 10 to 18 carbon atoms per molecule. The gas most commonly filtered is air. The filtering medium may comprise any porous construction as previously mentioned, but the preferred medium is glass fibers. The size and length of the glass fibers are not critical. Most of the different size fibers known can satisfy these requirements. As an example, fibers having diameters from 0.0045 inch to 0.0080 inch and lengths from 15 to 25 or more inches may be used. Glass fibers having these and similar sizes and dimensions may be attenuated from molten glass through suitable orifices and cast down, for example by a steam blower, onto a reticulated moving conveyor thereby forming a closely interlaced mat more commonly known as the filter pack.

Immediately after their formation, the mats may be sprayed with any suitable type of a resin or elastomer in an amount sufficient to bind the fibers one to another. The resin or elastomer is subsequently hardened. For example, if a thermosetting resin such as phenol formaldehyde is used, the mats or packs are passed through an oven to polymerize the resin and thereby form a semi-rigid pack. The thickness and density of such packs are not critical. More for the sake of convenience, the packs may be about one-half of an inch thick. They may be cut to any desired length and width by large steel blades. The density of the pack is limited by the porosity desired on one hand, and the resistance of the pack to fluid flow through it on the other.

A given number of the packs are then used to build up to a desired thickness. In one embodiment of the invention, a series of such packs are then faced with reticulated metallic frames and bound on the edges with a fiberboard frame. Such a unit may also contain several filter packs of varying densities.

The pack may be impregnated or coated with the adhesive before or after it is cut to the desired dimensions. That is, the pack may be impregnated with the adhesive immediately after the curing of the bonding resin and while the pack is still on the conveyor on which it was originally formed. Or the impregnation may be delayed until the pack is cut to the desired dimensions. In this case, the pack is processed on a separate conveyor system. Likewise, the impregnation may be by any of the well-known methods. For example, the pack may be dipped into a vat or tank containing an adhesive of the present invention. Or the adhesive may be sprayed on. For instance, the preferred method is to first cut the pack to size by large steel knives immediately after the curing of the resin and then to impregnate them with the adhesive by spraying. In this embodiment, the packs are placed on a moving conveyor which passes below a spray nozzle or gun of conventional design from which the adhesive is shot. The adhesive may be at room temperature or somewhat higher if necessary to make it more fluid. If desired, the adhesive may be diluted as, for example, with tributyl citrate, up to about 50 percent by volume, before application to the filter pack. After the impregnation, the adhesive may constitute 12 to 15 percent by weight of the filter pack.

The materials used to produce the adhesives of this invention comprise dehydrated hexitols or hexatomic alcohols, saturated fatty acids having 10 to 18 carbon atoms per molecule, and alkylene oxides.

Hexitols such as sorbitol, mannitol, dulcitol, and iditol may be used. The dehydration of such hexitols may be accomplished under reduced pressure and elevated temperatures, such as 125° C. to 150° C., as disclosed in the United States Patent No. 2,390,395 to Soltzberg. The dehydration need not be confined to the loss of a single molecule of water. The hexitol, for example, may be dehydrated removing one molecule of water to form a hexitan (monoanhydrohexitol) or two molecules to form a hexide (dianhydrohexitol). The preferred dehydrated hexitol is sorbitan. The acids may be those long chain, saturated fatty acids selected from the class consisting of capric, undecylic, lauric, tridecoic, myristic, pentadecanoic, palmitic, margaric, and stearic. The preferred fatty acid is lauric. The alkylene oxides comprise ethylene, propylene, and butylene oxides. Ethylene oxide is preferred.

The reactions involved in making the adhesives of the present invention are not complex and will be understood by those skilled in the art. In preparing these adhesives, the hexitol is heated with the fatty acid in the presence of an acid catalyst, such as sulfuric acid, at elevated temperatures. The amount of the acid catalyst may be about 1% by weight of the hexitol. Dehydration of the hexitol occurs with subsequent esterification of the hexitan or hexide by the fatty acid. The degree of the esterification depends on the amount of fatty acid present and the esterifiability of the dehydrated hexitol. Usually, the monoesters form most readily. In no case should complete esterification of all hydroxyl groups be obtained since this prohibits modification of the ester by the alkylene oxides. As an example of this reaction, the following shows the formation of sorbitan monolaurate from sorbitol involving a single dehydration and reaction with lauric acid.

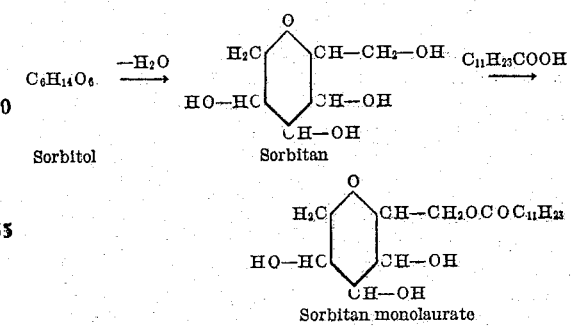

One or more of the free hydroxyl group or groups of the resulting ester are then reacted with alkylene oxide. The molar ratio of the alkylene oxide to the ester in this reaction may vary widely. For instance, it may range from 6:1 to 20:1.

The alkylene oxide modified esters of the saturated fatty acids of a molecular weight greater than that of tridecoic acid are very oily and tend to become waxy upon standing at room temperature. Consequently, if desired, a diluent, such as tributyl citrate, may be used. The amount may vary up to 50% by volume.

The preferred adhesive is an ethylene oxide derivative of the reaction product of dehydrated sorbitol and lauric acid. In practice, the adhesive used may be any of the indicated end products or a mixture of two or more.

The adhesives of the present invention contain both oil soluble and water soluble groups within their molecules. These two types of groups apparently account for the ability of the adhesives to remove dust and many other foreign particles from the gas being filtered.

The adhesives of the present invention do not unduly smoke nor volatilize even at temperatures above room temperature. One adhesive, a polyoxyalkylene derivative of the reaction product of dehydrated sorbitol and lauric acid has a flash point of 610° F. and a fire point of 655° F. Underwriters usually require a flash point of only 350° F. This same adhesive has a dust catching efficiency of about 85%. The present adhesives may be used on filter packs bonded with a thermosetting resin, such as phenol formaldehyde, or even with elastomers such as natural rubber or thermoplastics such as polyvinyl acetate. The adhesives are not hygroscopic to a deleterious extent. Their viscosities do not vary excessively at normal operating temperatures. They have little or no odor, are chemically stable during storage, and do not support the growth of disagreeable bacteria. They are also non-irritating to human skin. Further, extensive animal feeding tests have not shown them to be toxic.

Various modifications and variations may be made in the invention within the spirit and scope of the appended claims.

I claim:

1. A gas filter comprising fibers bonded at least at their junctures by an elastomer and carrying on the fiber surfaces a polyoxyalkylene derivative of the reaction product of a dehydrated hexitol and a saturated fatty acid having 10 to 18 carbon atoms per molecule.

2. A gas filter comprising a gas-permeable medium composed of fibers interlaced and bonded at least at their junctures by an elastomer, said fibers carrying on their surfaces an adhesive comprising the reaction product of an alkylene oxide with the reaction product of a dehydrated hexatomic alcohol and a saturated fatty acid having 10 to 18 carbon atoms per molecule, said alkylene oxide being selected from the group consisting of ethylene, propylene, and butylene oxides.

3. A gas filter comprising glass fibers bonded at least at their junctures by an elastomer, and an adhesive contacting the surface of the fibers comprising an alkylene oxide derivative of the reaction product of a dehydrated hexitol and a fatty acid; said dehydrated hexitol being selected from the group consisting of a hexitan and a hexide; said fatty acid being selected from the group consisting of capric, undecylic, lauric, tridecoic, myristic, pentadecanoic, palmitic, margaric, and stearic acids; and said alkylene oxide being combined with said reaction product in a molar ratio ranging from 6:1 to 20:1, respectively; said adhesive having a non-plasticizing reaction on the elastomer.

4. A gas filter comprising glass fibers interlaced in a jackstraw manner and bonded at least at their junctures by an elastomer, and an adhesive contacting substantially the entire surface of the fibers comprising the reaction product of an alkylene oxide, a dehydrated hexitol, and a saturated fatty acid having 10 to 18 carbon atoms per molecule, said alkylene oxide being selected from the group consisting of ethylene, propylene, and butylene oxides, and said hexitol being selected from the group consisting of sorbitol, mannitol, dulcitol, and iditol, said adhesive having a non-plasticizing reaction on the elastomer.

5. As an article of manufacture, an air filter comprising a pack of glass fibers arranged in a helter skelter fashion and bonded one to another at least at their intersections by an elastomer to form a porous semi-rigid pack, said pack being bound on the edges by suitable material to impart rigidity and strength to the pack, said filter containing an adhesive contacting substantially the entire surface of the fibers and having a non-plasticizing reaction on the elastomer, said adhesive comprising the reaction products of ethylene oxide and the monoester of sorbitan and lauric acid, said oxide and said monoester being reacted approximately in the molar ratio of 20:1.

6. An air filter comprising glass fibers closely interlaced in a jackstraw manner and bonded one to another at least at their junctures by an elastomer to form a porous, semi-rigid pack, and an adhesive contacting substantially the entire surface of the fibers, said adhesive comprising the reaction product of ethylene oxide, dehydrated sorbitol, and lauric acid, and having a non-plasticizing reaction on the elastomer.

WILLIAM L. TROWBRIDGE.

REFERENCES CITED

The following references are of record in the file of this patent:

UNITED STATES PATENTS

| Number | Name | Date |
|---|---|---|
| 2,078,197 | Hooker et al. | Apr. 20, 1937 |
| 2,083,132 | Williams et al. | June 8, 1937 |
| 2,124,370 | Gaarder | July 19, 1938 |
| 2,322,820 | Brown | June 29, 1943 |
| 2,322,821 | Brown | June 29, 1943 |
| 2,353,937 | Smith | July 18, 1944 |
| 2,380,166 | Griffin | July 10, 1945 |

OTHER REFERENCES

"Surface Active Agents," Published by Atlas Powder Co., October 1948.

"Spans and Tweens," Published by Atlas Powder Co., October 1942.